(12) United States Patent
Liversidge et al.

(10) Patent No.: X9408
(45) Date of Patent: Feb. 17, 1836

(54) STARCH, RICE

(76) Inventors: Walter Liversidge; Thomas Liversidge

Walter Liversidge and Thomas Liversidge, of Dorchester, Mass.

Letters Patent.

The schedule referred to in these Letters Patent and making part of the same containing a description in the words of the said Walter Liversidge and Thomas Liversidge themselves of their improvement in the application of rice to the manufacture of Starch.

To all to whom these presents shall come.

Be it known that we Walter and Thomas Liversidge of Dorchester in the county of Norfolk, and Commonwealth of Massachusetts have invented a new and useful improvement in the manufacture of Starch, by the application of rice to this purpose. We claim a Patent for manufacturing Starch from rice or for the application of rice as a substitute for other substances heretofore used in the manufacture of Starch, and the following is a full and exact description of the method of manufacture used by us.

1st. To 100 Gallons of Water add 60lbs. of Chloride of lime stir it well and then let it stand to settle 12 hours, next draw off the clear liquor, and to every 100 gallons add 8lbs. of sulphuric acid, let it stand 24 hours then draw off the clear liquor to be used as follows. 2d. To any quantity of rice, add as much of this liquor as will just cover it, and let it remain 48 hours stirring it once in 6 or 8 hours, then drain off the liquor.

3d. It must now be ground in a mill with as much water as will reduce the rice when ground to about the consistency of Cream. The Mill now used for grinding wheat in the manufacture of Starch or any other which will reduce the rice with water to a fluid, free from hard particles, will answer the purpose, for the purpose of experiment the rice prepared as above, may be ground in a Mortar. 4th. To every 100 gallons of the liquid as it comes from the mill. add as much water pass it through a sieve of the finest Dutch bolting Cloth, & then let the liquid stand 24 hours. 5th. Draw off the clear water, and the Starch will be found precipitated put it into a coarse cotton bag, or box with several holes bored in it and lined with cotton, to drain 12 hours or until solid and then dry it.

Witnesses. Samuel Richardson
J. Liversidge

Walter Liversidge.
Thomas Liversidge.